US011397876B2

(12) United States Patent
Vasseur et al.

(10) Patent No.: US 11,397,876 B2
(45) Date of Patent: Jul. 26, 2022

(54) ASSESSING DATA FIDELITY IN A MACHINE LEARNING-BASED NETWORK ASSURANCE SYSTEM

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US); Andrea Di Pietro, Lausanne (CH); Grégory Mermoud, Veyras (CH); Pierre-Andre Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 278 days.

(21) Appl. No.: 16/692,165

(22) Filed: Nov. 22, 2019

(65) Prior Publication Data

US 2021/0158106 A1   May 27, 2021

(51) Int. Cl.
| | |
|---|---|
| *G06K 9/62* | (2022.01) |
| *H04L 43/0829* | (2022.01) |
| *H04L 41/0631* | (2022.01) |
| *G06N 20/00* | (2019.01) |
| *H04L 41/147* | (2022.01) |

(52) U.S. Cl.
CPC .......... *G06K 9/6265* (2013.01); *G06N 20/00* (2019.01); *H04L 41/0645* (2013.01); *H04L 41/147* (2013.01); *H04L 43/0829* (2013.01)

(58) Field of Classification Search
CPC .. G06K 9/6265; G06N 20/00; H04L 41/0645; H04L 41/147; H04L 43/0829
See application file for complete search history.

(56) References Cited

U.S. PATENT DOCUMENTS

| | | | |
|---|---|---|---|
| 10,567,237 B1* | 2/2020 | Powell | H04L 41/16 |
| 10,691,082 B2* | 6/2020 | Di Pietro | H04L 41/16 |
| 2014/0180738 A1 | 6/2014 | Phillipps et al. | |
| 2018/0144815 A1* | 5/2018 | Chapman-McQuiston | G16H 50/30 |
| 2018/0278486 A1* | 9/2018 | Mermoud | H04L 41/16 |

(Continued)

FOREIGN PATENT DOCUMENTS

| | | |
|---|---|---|
| CN | 109492193 A | 3/2019 |
| WO | WO-2019002603 A1 | 1/2019 |

OTHER PUBLICATIONS

Gudivada, V. et al., "Data Quality Considerations for Big Data and Machine Learning: Going Beyond Data Cleaning and Transformations", researchgate.net, Jul. 2017, pp. 1-21.

(Continued)

*Primary Examiner* — Philip C Lee
(74) *Attorney, Agent, or Firm* — Behmke Innovation Group LLC; Kenneth J. Heywood; Jonathon P. Western

(57) ABSTRACT

In one embodiment, a service computes a data fidelity metric for network telemetry data used by a machine learning model to monitor a computer network. The service detects unacceptable performance of the machine learning model. The service determines a correlation between the data fidelity metric and the unacceptable performance of the machine learning model. The service adjusts generation of the network telemetry data for input to the machine learning model, based on the determined correlation between the data fidelity metric and the unacceptable performance of the machine learning model.

18 Claims, 12 Drawing Sheets

(56) References Cited

U.S. PATENT DOCUMENTS

| | | | | |
|---|---|---|---|---|
| 2018/0367428 A1* | 12/2018 | Di Pietro | ............ | H04L 63/1408 |
| 2019/0140911 A1* | 5/2019 | Jain | ........................ | H04L 43/022 |
| 2019/0156264 A1* | 5/2019 | Biswas | .................. | G06Q 30/04 |
| 2019/0239158 A1 | 8/2019 | Wulff et al. | | |
| 2019/0332769 A1* | 10/2019 | Fralick | .................. | G06F 21/566 |
| 2020/0302234 A1* | 9/2020 | Walters | .................. | G06N 7/005 |
| 2021/0035015 A1* | 2/2021 | Edgar | .................. | G06K 9/6257 |

OTHER PUBLICATIONS

"MLOps", online: https://en.wikipedia.org/wiki/MLOps, dated Jan. 11, 2019, printed Nov. 19, 2019, 2 pages, Wikimedia Foundation, Inc.

* cited by examiner

ASSESSING DATA FIDELITY IN A MACHINE LEARNING-BASED NETWORK ASSURANCE SYSTEM

TECHNICAL FIELD

The present disclosure relates generally to computer networks, and, more particularly, to assessing data fidelity in a machine learning-based network assurance system or other system that uses machine learning.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

Unfortunately, machine learning-based systems are unavoidably complex in that they typically ingest data from multiple sources and rely on multiple versions of a trained model to make inferences about the network. In addition, the data patterns and the performances of the models are also likely to change over time. More specifically, if the fidelity/quality of the telemetry data assessed by the machine learning models drops, this can lead to poor model performance and corrective measures being taken, needlessly.

DESCRIPTION OF EXAMPLE EMBODIMENTS

Overview

Figure 1A:
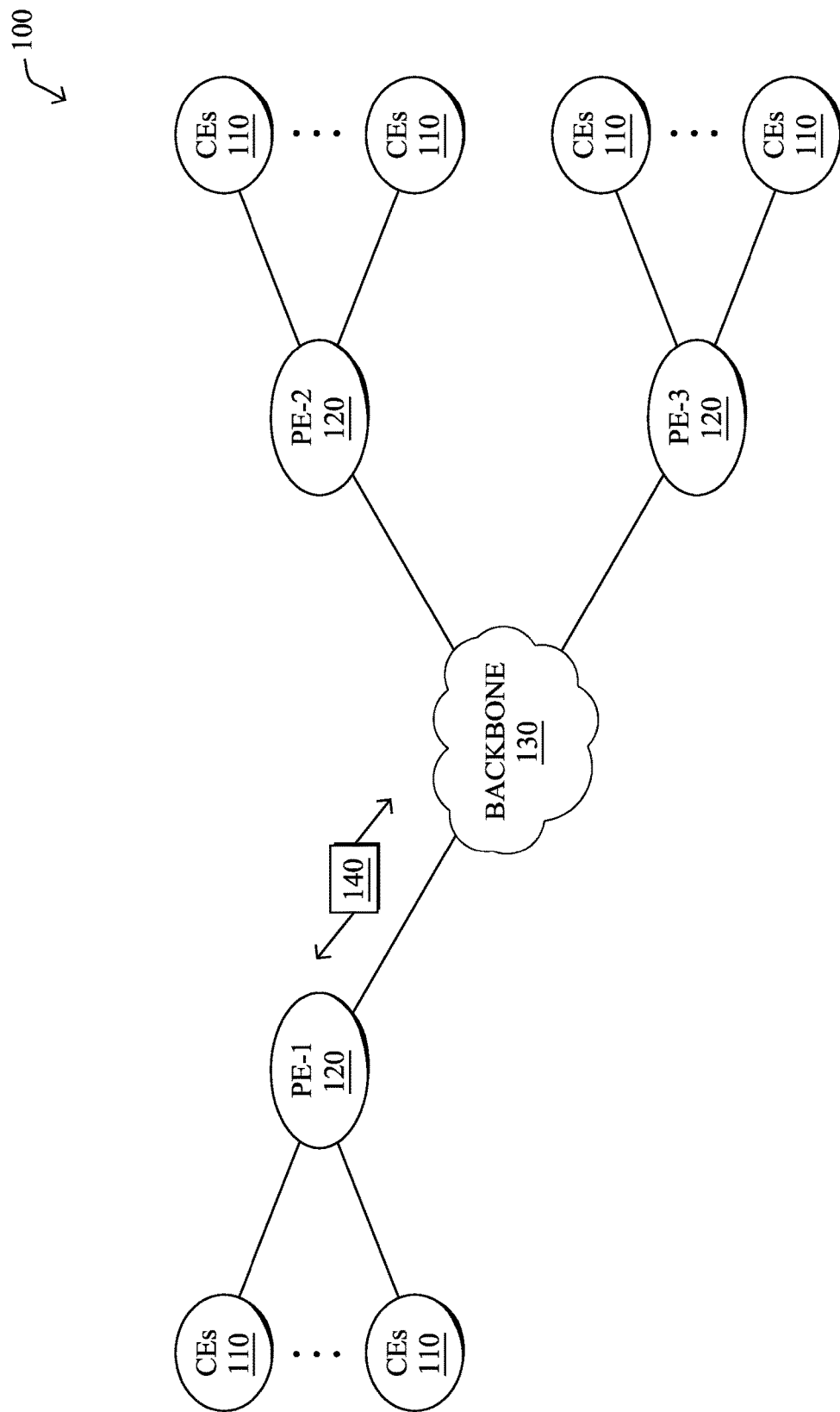
FIGS. 1A-1B illustrate an example communication network.

According to one or more embodiments of the disclosure, a service computes a data fidelity metric for network telemetry data used by a machine learning model to monitor a computer network. The service detects unacceptable performance of the machine learning model. The service determines a correlation between the data fidelity metric and the unacceptable performance of the machine learning model. The service adjusts generation of the network telemetry data for input to the machine learning model, based on the determined correlation between the data fidelity metric and the unacceptable performance of the machine learning model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
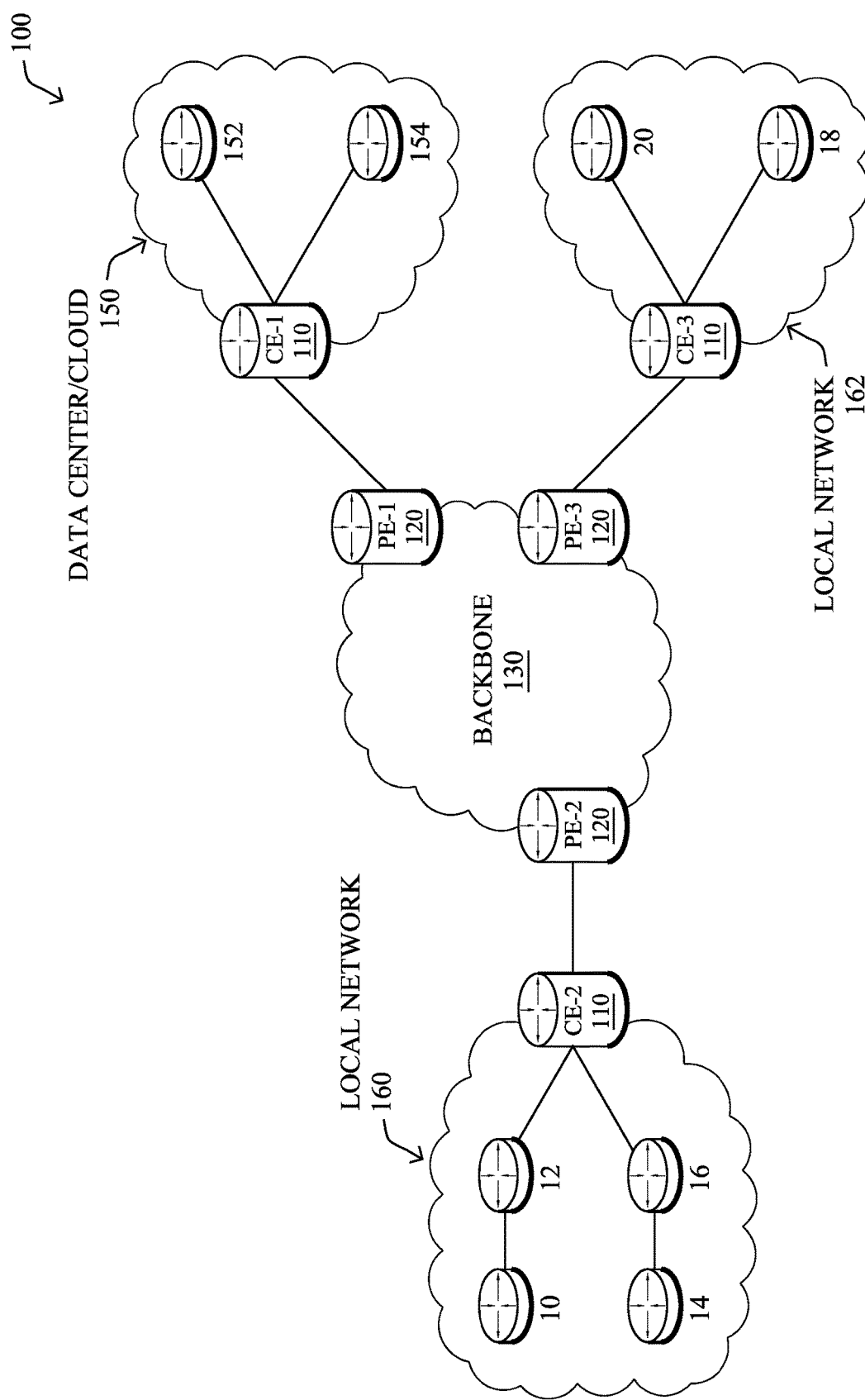

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
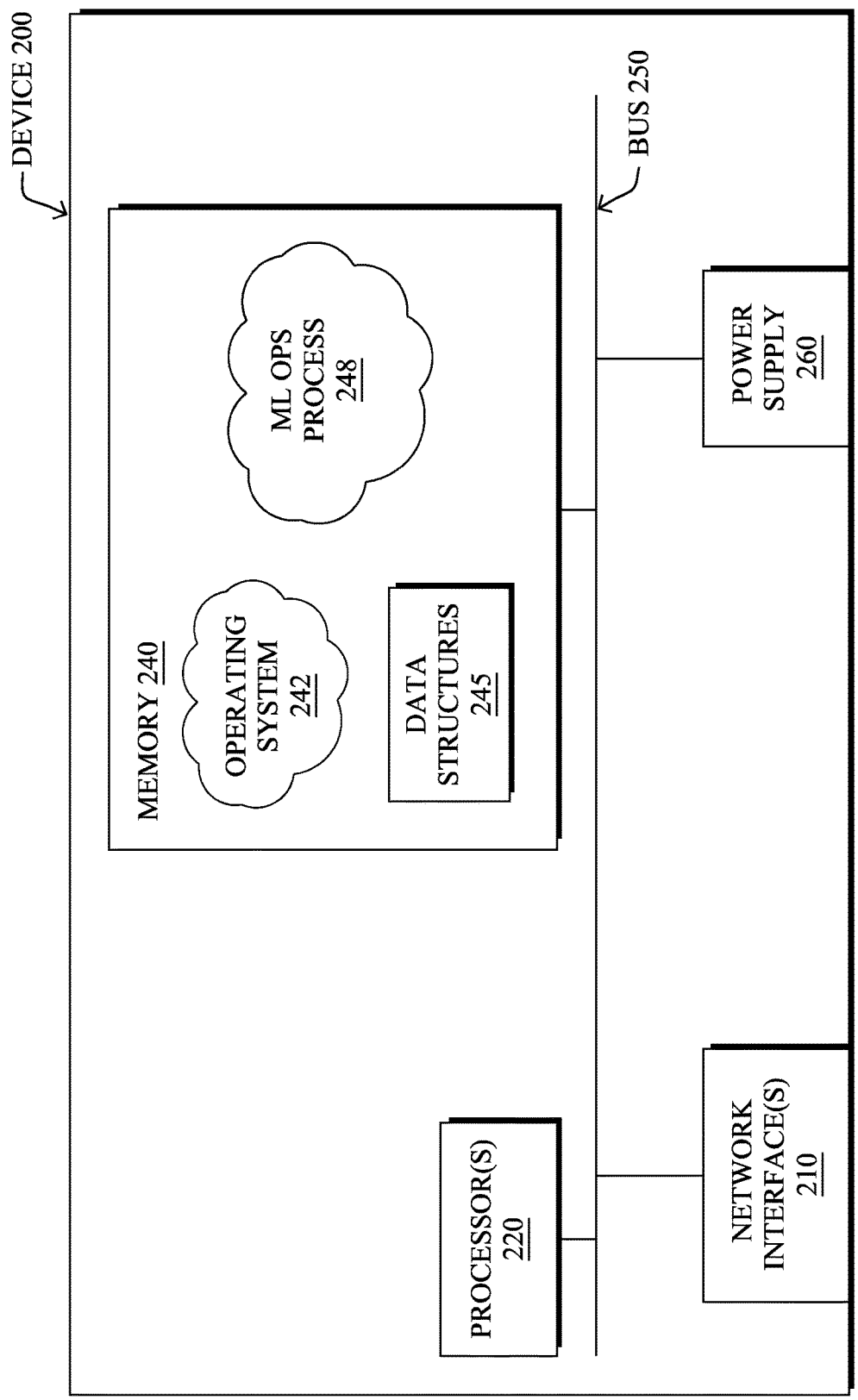
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning operations (ML Ops) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

ML Ops process 248 includes computer executable instructions that, when executed by processor(s) 220, cause device 200 to perform ML Ops functions as part of a network monitoring infrastructure for one or more networks. In general, ML Ops refers to the mechanisms by why machine learning models are created, deployed, and monitored over time. More specifically, in various embodiments, ML Ops process 248 may oversee the operations of one or more network monitoring services that utilize machine learning, such as a network assurance service, a device classification service, a network security service, or the like.

In some embodiments, ML Ops process 248 may itself utilize machine learning techniques, to monitor and adjust the operations of any number of ML-based network services. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, ML Ops process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that ML Ops Process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
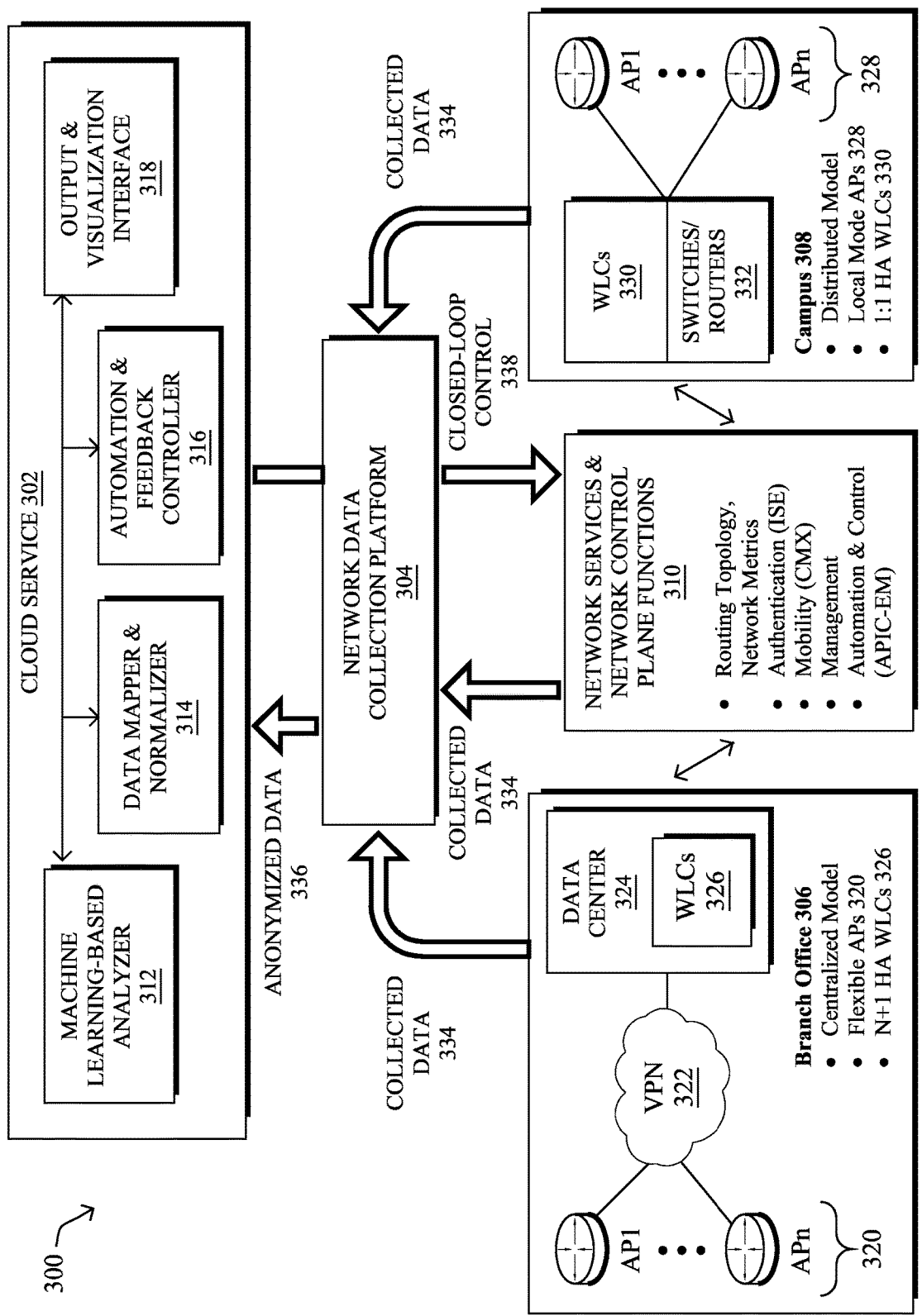
FIG. 3 illustrates an example network assurance system that uses machine learning to monitor a network.

FIG. 3 illustrates an example network assurance system 300 that uses machine learning to monitor a network, according to various embodiments. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

As shown, at the core of network assurance system 300 may be a cloud-based network assurance service 302 that leverages machine learning in support of cognitive analytics for the network, predictive analytics (e.g., models used to predict user experience, etc.), troubleshooting with root cause analysis, and/or trending analysis for capacity planning. Generally, network assurance system 300 may support monitoring for both wireless and wired networks, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, systems/services that use machine learning to monitor a network, such as service 302, are unavoidably complex, ingest data from multiple sources, and may rely on multiple versions of a trained model to make inferences about the network. This leads to a number of challenges. First, the data patterns and model performances are highly likely to change over time. These changes often require recalibration of the system, such as by retraining the model or addressing a data-quality issue. Second, for a single use case, multiple people and teams often experiment on parts of datasets, using different hyperparameters, and train different models for the same use case. This makes it almost impossible to compare and objectively choose the best model. In many machine learning-based systems, detecting such health issues and experimentation management is often done in an unscientific manner whereby issues are detected only when someone stumbles upon it. Such haphazard approaches in large machine learning-based systems clearly lead to inefficiency and production downtimes that are sometimes unnoticed for long periods of time or until a customer complains. Third, the quality/fidelity of the telemetry from the monitored network is of the utmost importance and must be carefully tracked, especially when it relates to the overall performance of the machine learning system.

Assessing Data Fidelity in a Machine
Learning-Based Network Assurance System

The techniques herein introduce a unified methodology, architecture, and monitoring service for machine learning-based systems, to ensure their proper operation. In some aspects, the techniques herein introduce quality metrics for the telemetry data assessed by a machine learning model, which quantify data fidelity issues such as missing data, ingestion issues, or spurious data. In another aspect, the techniques herein also assess the performance of the machine learning model itself according to various potential metrics. In a further aspects, the techniques herein introduce a mechanism to identify correlations between the performance of the model and the overall data quality. For example, the known tolerances of the trained model can be compared to its actual performance, to determine whether the data quality exceeds those tolerances. In another aspect, the techniques herein introduce a control loop that allows for the dynamic adjustment of the telemetry generation mechanism, so as to collect any missing data, correct for spurious data, or the like, to improve the performance of the machine learning model.

Specifically, according to one or more embodiments of the disclosure as described in detail below, a service computes a data fidelity metric for network telemetry data used by a machine learning model to monitor a computer network. The service detects unacceptable performance of the machine learning model. The service determines a correlation between the data fidelity metric and the unacceptable performance of the machine learning model. The service adjusts generation of the network telemetry data for input to the machine learning model, based on the determined correlation between the data fidelity metric and the unacceptable performance of the machine learning model.

Illustratively, the techniques described herein may be performed by hardware, software, and/or firmware, such as in accordance with the ML Ops process 248, or another process, which may include computer executable instructions executed by the processor 220 (or independent processor of interfaces 210) to perform functions relating to the techniques described herein.

Figure 4:
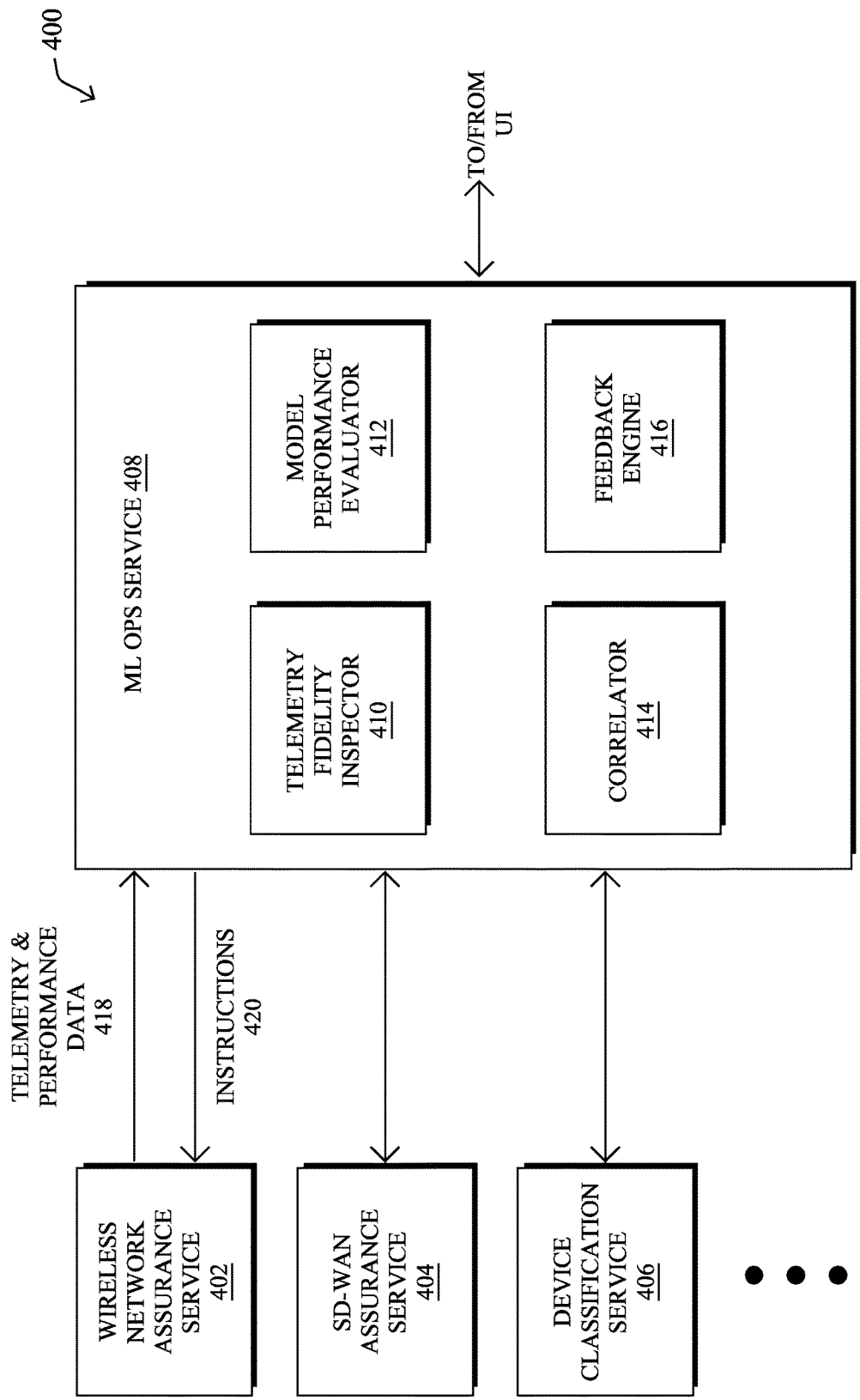
FIG. 4 illustrates an example architecture for assessing data fidelity in a machine learning system.

Operationally, FIG. 4 illustrates an example architecture 400 for assessing data fidelity in a machine learning system/service, according to various embodiments. At the core of architecture 400 is a machine learning (ML) operations (Ops) service 408 (e.g., as provided by one or more devices executing ML Ops process 248) that oversees the operations of any number of machine learning-based services/systems that each monitor one or more computer networks. For example, as shown, ML Ops service 408 may oversee the operation of a wireless network assurance service 402 that uses machine learning to monitor a wireless network, a software-defined wide area network (SD-WAN) assurance service 404 that uses machine learning to monitor an SD-WAN (e.g., to predict tunnel failures, etc.), a device classification service 406 that uses machine learning to classify devices in a network by device type, based on their behaviors, or the like.

As shown, ML Ops service 408 may comprise any or all of the following components: a telemetry fidelity inspector 410, a model performance evaluator 412, a correlator 414, and/or a feedback engine 416. In some embodiments, some or all of the components 410-416 of architecture 400 may be implemented as part of the machine learning-based service (e.g., services 402-406, etc.) itself or, alternatively, as part of a stand-alone service 408 that is in communication therewith. For example, services 402-406 may leverage application programming interfaces (APIs) of ML Ops service 408, thereby allowing service 408 to oversee the operations of the machine learning components of services 402-406.

According to various embodiments, ML Ops service 408 may include telemetry fidelity inspector 410, which is in charge of assessing the quality of telemetry data ingested by services 402-406. To that end, the machine learning-based service may send information regarding the performance of its model(s) and the telemetry data assessed by its model(s) to ML Ops service 408 for analysis. For example, wireless network assurance service 402 may send telemetry and performance data 418 to ML Ops service 408 for assessment, either on a pull or push basis. In turn, telemetry fidelity inspector 410 may compute a quality/fidelity metric that quantifies the quality/fidelity of the telemetry data from the monitored network.

In some cases, telemetry fidelity inspector 410 may base its data fidelity metric on the number of distinct entities in the network(s) monitored by services 402-406. For example, in the case of a wireless network, data 418 from wireless network assurance service 402 may indicate the number of unique Access Points (APs), radios, clients, etc., in the network. This allows telemetry fidelity inspector 410 to track changes in entity-related metrics for the network. If the number of networking entities (e.g., APs, WLCs, radios, etc.) and/or number of clients drastically changes, telemetry fidelity inspector 410 may lower the data fidelity metric for the network, accordingly. Indeed, such changes in the number of devices or other entities in the network may affect the fidelity of the resulting telemetry data, especially when a few routers are added that generate spurious telemetry data (e.g., due to execution of an older version of software). In large deployments, it is hard to manually monitor the changes and its impact on fidelity. For example, in the case of a wireless network, telemetry fidelity inspector 410 may monitor any or all of the following:

Number of APs
Number of Radios and Variation Score
Number of Clients and Variation Score
Number of Client Events
Approximate Number of Clients/Radios
Number of Client Events/Clients In further embodiments, telemetry fidelity inspector 410 may base its data fidelity metric on the specific fields and missing values in the telemetry data assessed by services 402-406. More specifically, the various entities in the monitored network (e.g., radio, client, etc.) may generate multiple fields of telemetry data that are then analyzed by the machine learning models of services 402-406. Accordingly, telemetry fidelity inspector 410 may track the generated fields and identify when a telemetry data field is missing.

Figure 5:
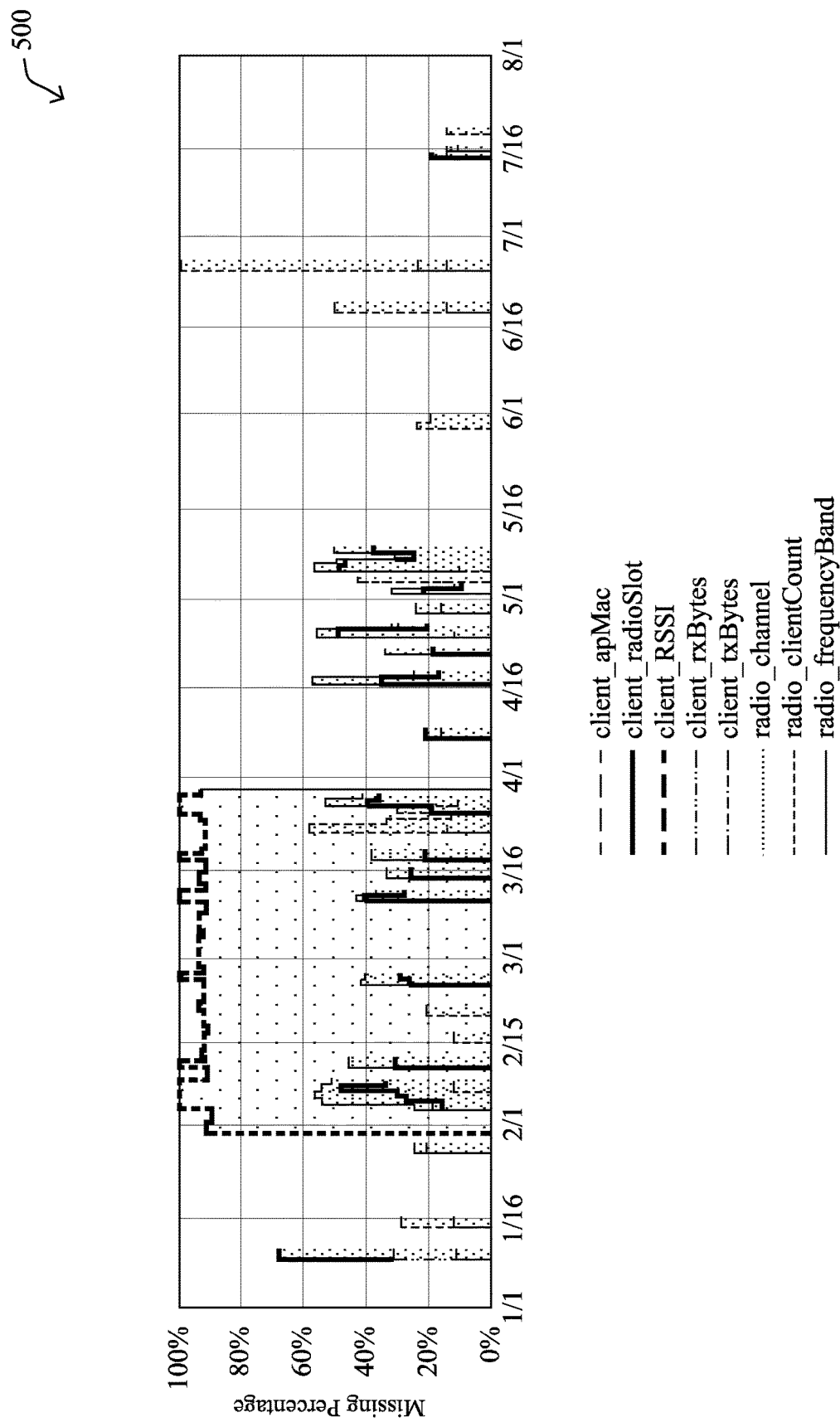
FIG. 5 illustrates an example plot of the percentages of missing telemetry data.

FIG. 5 illustrates an example plot 500 of the percentages of missing telemetry data observed during preliminary testing of the techniques herein. As shown, plot 500 plots the percentage of missing values observed over time in an actual network over time for the following telemetry data fields:

Client AP MAC address (client_ap_Mac)
Client Radio Slot (client_radioSlot)
Client RSSI (client_rssi)
Client Received Bytes (client_rxBytes)
Client Transmitted Bytes (client_txBytes)
Radio Channel (radio_channel)
Radio Client Count (radio_clientCount)
Radio Frequency Band (radio_frequencyBand)

From plot 500, it can be seen that the percentage of missing values on the y-axis of several of the above telemetry data fields are not consistent over time. Often times, this inconsistency is overlooked during training of a machine learning model, which can impinge on its performance after deployment. Indeed, it was observed in a live network that the percentage of missing values for several telemetry data fields spiked over a period of several days with one particular field, radio_channel, reaching 90-100% missing values for approximately two months. In various cases, telemetry fidelity inspector 410 may capture such information in real time and base its data fidelity metric in part on the percentage or amount of missing values in the telemetry data used by a machine learning model of services 402-406.

Figure 6:
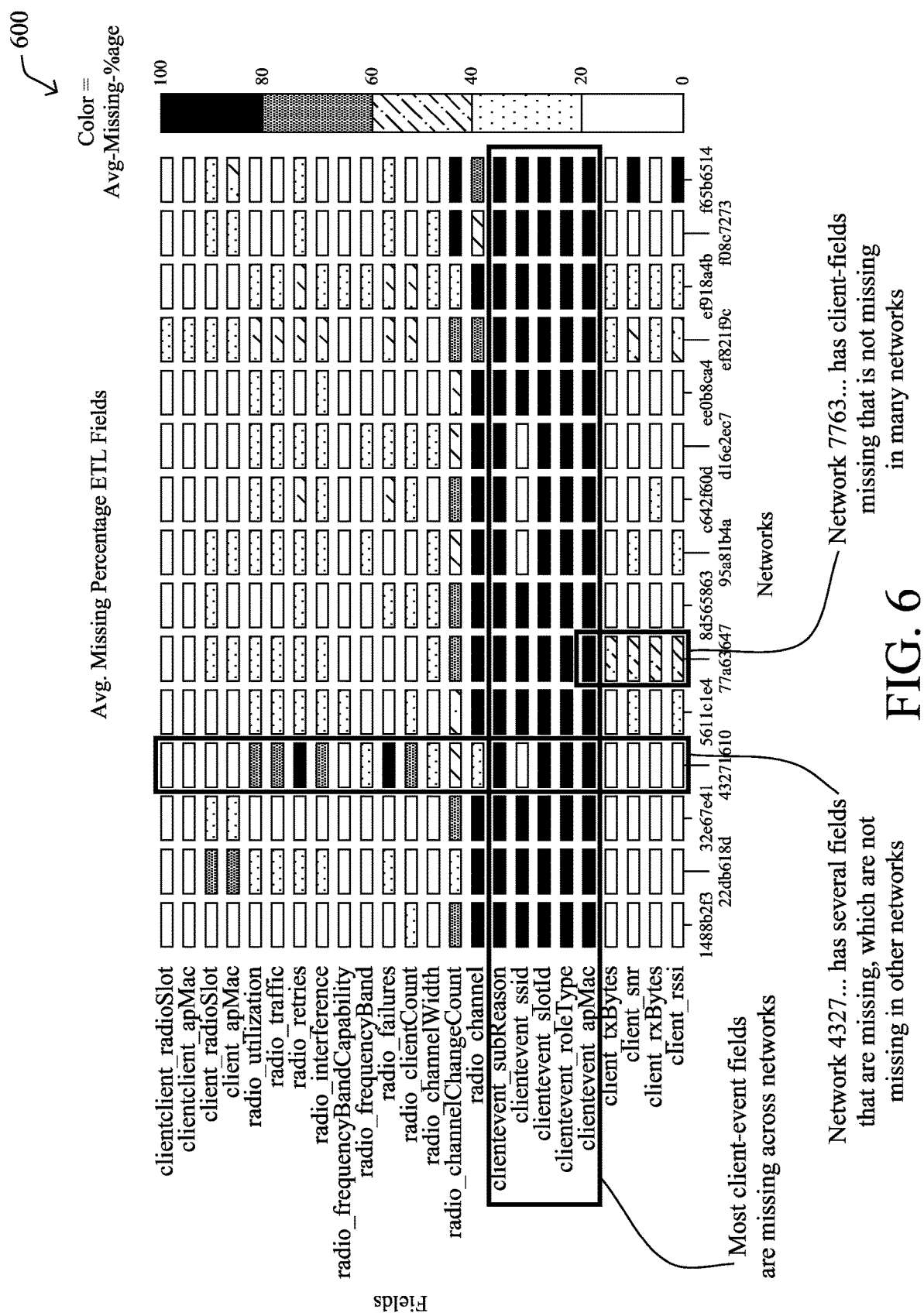
FIG. 6 illustrates an example plot of missing telemetry data values across networks.

FIG. 6 illustrates an example plot 600 of missing telemetry data values across network. In some embodiments, any or all of services 402-406 shown in FIG. 4 may monitor multiple networks. Accordingly, in one embodiment, telemetry fidelity inspector 410 may also assess local vs. global effects of missing telemetry data values on the data fidelity. Plot 600 illustrates the missing percentages of several telemetry data values (y-axis) across different networks (x-axis). Quite unexpectedly, the percentage of missing values varies across networks and over time, thus requiring the system to dynamically and continuously compute those metrics.

Referring again to FIG. 4, another factor that telemetry fidelity inspector 410 may consider when computing a data fidelity metric for the telemetry data assessed by a machine learning model of services 402-406 is spurious data within the telemetry data, in some embodiments. For example, the radio RSSI for a typical wireless AP may fall within the range of 0-100. However, any spurious values, such as a negative value or one that exceeds 100, clearly indicates corruption of the data and may negatively affect the performance of the machine learning model that relies on this telemetry measurement. Thus, telemetry fidelity inspector 410 may compare the values in the telemetry data to their expected ranges, to detect spurious data, and lower its data fidelity metric, accordingly.

A further condition that may affect the fidelity of telemetry data relates to data ingestion issues in the monitored network. Indeed, networking devices or software entities in the monitored network are expected to continuously feed several forms of raw telemetry data (e.g., data from APs, authentication servers, DHCP servers, etc.) to the machine learning model. Any change in the ingestion process, such as a change in the sampling or reporting frequency for the data, may negatively affect the performance of the model. Thus, in various embodiments, telemetry fidelity inspector 410 may also assess the timing aspects of the telemetry data collection mechanism in the monitored network, to compute a data fidelity metric for the telemetry data.

Figure 7:
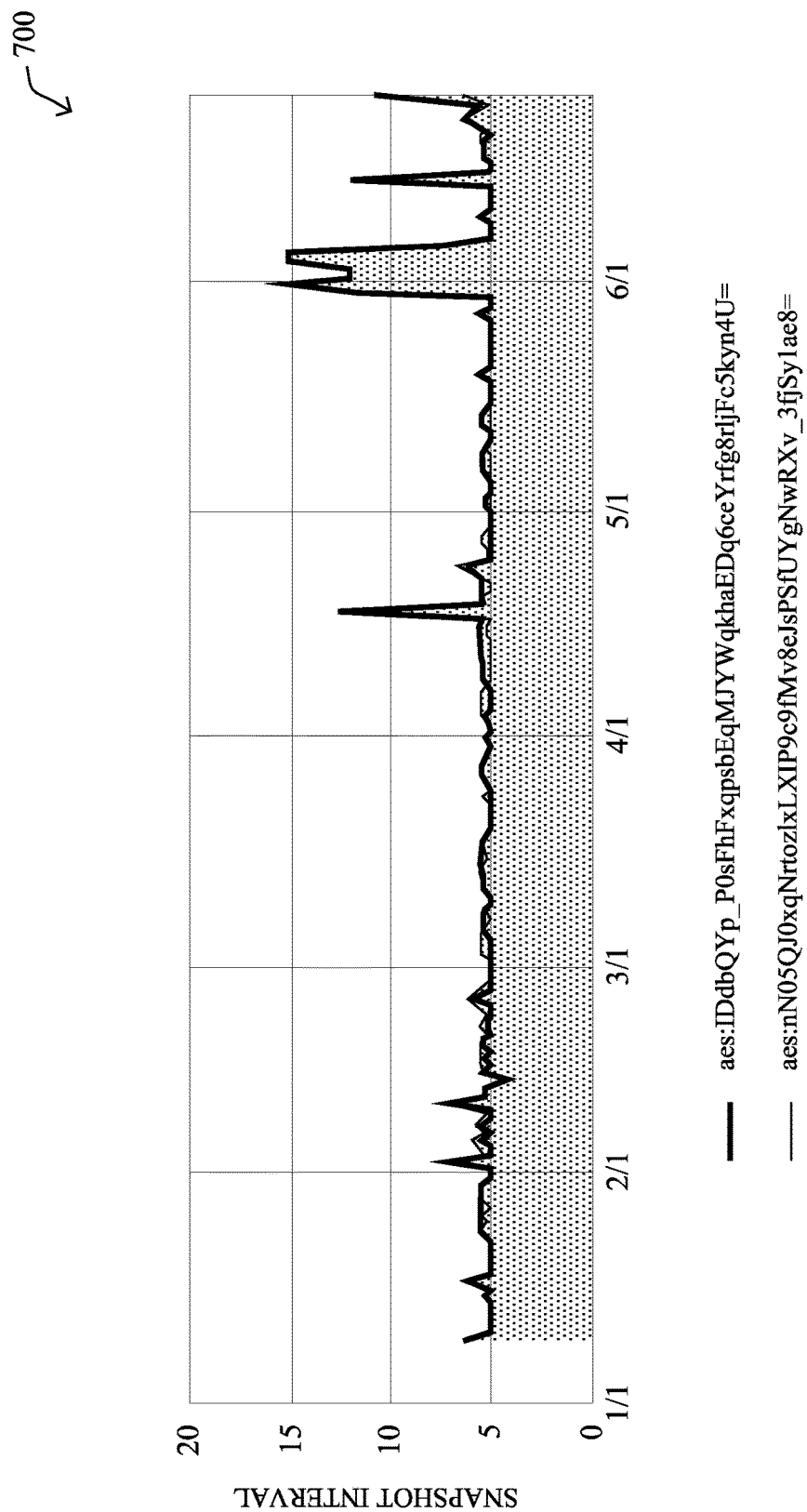
FIG. 7 illustrates an example plot showing telemetry data ingestion issues.

FIG. 7 illustrates an example plot 700 showing telemetry data ingestion issues. More specifically, plot 700 shows the inter-arrival times of one telemetry data metric across two different WLCs in a live network. The telemetry data was configured to arrive once every five minutes for processing, which holds true in most cases. However, as can be seen in plot 700, there are days where the inter-arrival times reach up to fifteen minutes. As would be appreciated, such a sudden thinning down of the telemetry data for input to a machine learning model may negatively affect its performance. Accordingly, telemetry fidelity inspector 410 may also decrease the data fidelity metric for the monitored network, if the telemetry reporting mechanism in the network is not reporting telemetry data at its expected times.

Referring yet again to FIG. 4, consider the case in which data 418 indicates that certain telemetry data values collected by wireless network assurance service 402 are missing. To detect potential issues associated with these missing values, telemetry fidelity inspector 410 may employ a threshold-based technique. In one embodiment, telemetry fidelity inspector 410 may consider the percentage of missing data per field. Then, whenever the percentage of missing data is greater than some predefined threshold (say, 20%), telemetry fidelity inspector 410 may raise an event with information about the missing telemetry data values. For example, such an event may be of the form: {"customer": "<customerName>", "field": "<fieldname>", state: "missing", time: [<startTime>, <endTime>]}.

Telemetry fidelity inspector 410 may aggregate any missing value events, to indicate aggregate-missing-events such as a field missing for potentially a group of customers/networks. In another embodiment, telemetry fidelity inspector 410 may raise a "per group" missing value event. The "per group" approach is slightly more complex. Indeed, various mechanisms may be used for reporting missing data, which are specific to the environment. For example, in some networks, it is not uncommon to observe a given percentage of missing telemetry data of a given type because such data is reported using a type of switch or a mechanism that are not appropriately set up or provisioned. Thus, telemetry fidelity inspector 410 may also be configured to consider up to a certain percentage of missing telemetry data as 'normal' for a given type or group of telemetry data values, depending on the configuration of the network (e.g., based on the type of network, OS release, type of switch, etc.).

In yet another embodiment, telemetry fidelity inspector 410 may comprise an anomaly detector that assesses the time series of telemetry data from the monitored network(s), to dynamically learn the "usual" percentage of missing data for a given telemetry data variable across the network. Such an approach allows telemetry fidelity inspector 410 to detect abnormal spikes in the percentage of missing data. Telemetry fidelity inspector 410 may then compute a data quality metric on a per-category basis for the telemetry data and, potentially, for each telemetry data variable. Telemetry fidelity inspector 410 can then use these sub-metrics to compute a finalized data fidelity metric for the network, in some embodiments.

Figure 8:
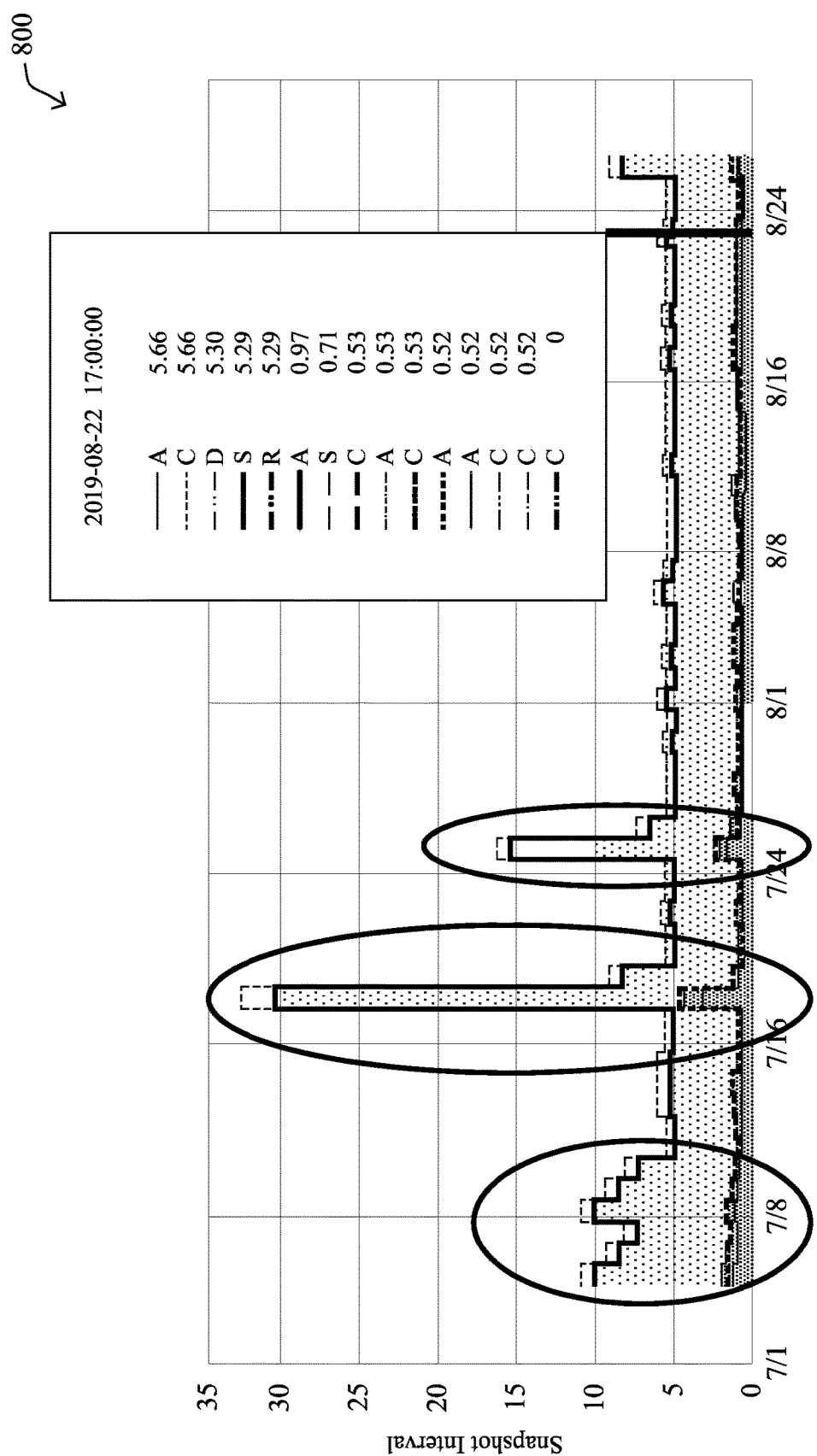
FIG. 8 illustrates an example plot showing the inter-arrival times of telemetry data.

By way of another example, consider the case in which there are data ingestion issues. Assume, for instance, that a machine learning model of services 402-406 periodically ingest telemetry data at a specific frequency. For example, plot 800 in FIG. 8 illustrates the inter-arrival times/snapshot intervals for several types of telemetry data collected in a live network. From plot 800, it can be seen that some of the telemetry data consistently arrives for analysis by the model at an interval of approximately five minutes, while other values arrive at approximately every thirty seconds.

Referring again to FIG. 4, telemetry fidelity inspector 410 may detect spikes or variations in the snapshot interval for a telemetry data variable by simply performing a lookup of the snapshot interval for that variable. If the actual snapshot interval varies more than a defined threshold (say >1.5 or <0.75 times configured interval), then telemetry fidelity inspector 410 may raise an ingestion-frequency-change event, indicating the type of the data and amount of change.

In another embodiment, telemetry fidelity inspector 410 may 'baseline' each the snapshot interval for a type of telemetry data using a technique that evaluates its mean or moving average. In such cases, any significant change with respect to the baseline will then trigger an ingestion-frequency-change event.

In yet another embodiment, telemetry fidelity inspector 410 may leverage a time-series change detection algorithm, to detect changes in the snapshot intervals of a telemetry data variable. For example, telemetry fidelity inspector 410 may employ a cumulative sum-based algorithm or other suitable algorithm configured to detect changes in a time series, to identify when the ingestion frequency for a telemetry data variable has changed.

With respect to spurious data, telemetry fidelity inspector 410 may also assess the telemetry data, to ensure that it falls within its expected/normal range. To do so, telemetry fidelity inspector 410 may rely on user input (e.g., via a UI of service 408) that defines the expected ranges of each telemetry data variable. In turn, if an observed value is outside its expected range, telemetry fidelity inspector 410 may flag the data as being spurious.

In another embodiment, telemetry fidelity inspector 410 may detect spurious telemetry data using a statistical technique. For example, if a field is known to have a normal distribution (which can be tested via well-known normality tests such as Shapiro-. Wilk test), then telemetry fidelity inspector 410 can estimate the mean and standard deviation (stddev). Telemetry fidelity inspector 410 can then raise a spurious data event when the field falls outside the range [−N*stddev, N*stddev], where N is a chosen multiplier. For example, N=3 indicates that 99.7% of the values fall within the range. Telemetry fidelity inspector 410 can also leverage other non-parameteric methods, if the value does not fall within a given range. For example, $0.15^{th}$ percentile and $99.85^{th}$ percentile values can be measured for a large enough timeframe and those values as approximate maximums and minimums. Note that such calculations are also likely to require constant recalibration and re-evaluation. Further, if a field is categorical (e.g., router model), then a spurious value can be triggered by telemetry fidelity inspector 410, whenever a new category appears.

In yet another embodiment, telemetry fidelity inspector 410 may simply count, for each telemetry data variable, the number of times a value is observed that is likely to be spurious (abnormal) according to the approach specified above.

At this point, telemetry fidelity inspector 410 may compute an overall aggregated quality metric for the telemetry data that weights any or all of the above considerations (e.g., missing values, data ingestion issues, and/or spurious data), according to various embodiments. In one embodiment, telemetry fidelity inspector 410 may track each of these considerations as part of a 3-Dimensional (3-D) time series or, alternatively, as individual time series.

Figure 9:
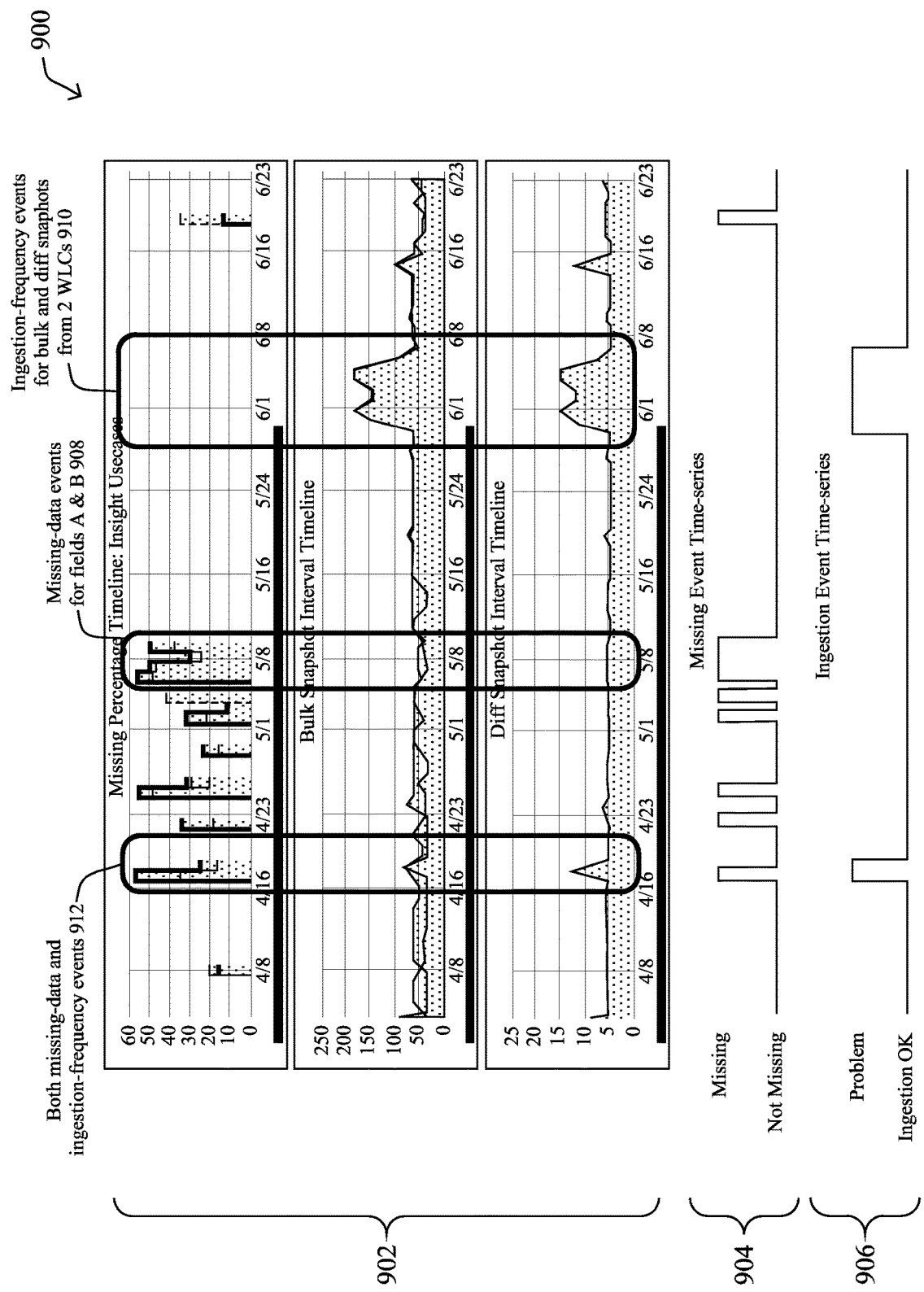
FIG. 9 illustrates example plots comparing data quality/fidelity event time series.

For example, FIG. 9 illustrates example plots comparing data quality/fidelity event time series. As shown, plots 902 show the missing telemetry data values and data ingestion issues observed in a live network. The region marked by box 908 shows that two fields have a high percentage of missing values, resulting in two missing data events. Box 910 shows the ingestion frequency events raised due to changes in two types of data ingestion (e.g., bulk and diff snapshots) for two WLCs in the network. Box 912 shows the times where there are both missing-data and ingestion-frequency events in the telemetry data from the network.

In one embodiment, telemetry fidelity inspector 410 may convert its raised events into binary time series that indicate when the various events were raised. For example, time series 904 indicates when data was missing or not missing, based on the raised missing-data events. Similarly, time series 906 indicates when there were data ingestion problems or not, based on the raised ingestion-frequency events. These binary time-series (e.g., fidelity metrics) provide input data that can be used to assess their effects on the performance of the machine learning model that uses the telemetry data as input.

Referring again to FIG. 4, architecture 400 may also include model performance evaluator 412 that is configured to determine the performance of the machine learning models used by services 402-406. For example, model performance evaluator 412 may evaluate the received data 418, to determine whether the machine learning model(s) of wireless network assurance service 402 are performing acceptably or unacceptably.

In one embodiment, model performance evaluator 412 may evaluate the performance of a machine learning model by constructing a binary time-series of model performance (e.g., to indicate points in time when the performance is acceptable or not) This can be constructed by evaluating the model performance against a well-chosen metric. For example, for an anomaly detection engine that is trained to choose 1% of records as anomalies over a long-time interval, model performance evaluator 412 may quantify the percentage of records observed as anomalies. Model performance evaluator 412 may then choose to tag the model performance as unacceptable (e.g., "Not OK"), if the percentage of records observed as anomalies exceeds 5%. Note that such a scheme requires sufficient samples to be taken over a relatively longer period of time and, hence, can also be used to detect root-causes for the lowered performance.

By way of example, assume that the machine learning model of wireless network assurance service 402 comprises a dine series regressor that predicts the network throughput in the next thirty minutes. In such a case, the error in the predicted value can be directly estimated in the next time step. In turn, based on the error, model performance evaluator 412 can determine whether the performance of the model is unacceptable or acceptable.

Other model inference metrics, such as prediction probability, can also be used by model performance evaluator 412 to determine the model performance. For example, model performance evaluator 412 may track the prediction probability of the model over time, to periodically determine (e.g., every two hours) whether the model is performing acceptably. In yet another embodiment, model performance evaluator 412 may use the quantile loss metric (since predictions are done using percentile regression) for its assessment of the performance, thus dealing with an objective performance metric.

A further component of architecture 400 may be correlator 414 that is configured to determine a correlation between the data fidelity metric from telemetry fidelity inspector 410 and the model performance evaluated by model performance evaluator 412. In other words, correlator 414 may determine whether a data fidelity issue or issues present in the telemetry data assessed by a machine learning model of any of services 402-406 is negatively impacting the performance of that model.

In one embodiment, correlator 414 may use association rule mining, to determine the probable cause for a drop in model performance. For instance, correlator 414 may create, for each time period in which the model performance was not acceptable, a <missing-event-state, ingestion-frequency-state> tuple, where the value of each is represented in binary fashion (e.g., "Missing" or "Not Missing," etc.). Other tuples are also possible, depending on the factors considered by telemetry fidelity inspector 410. In addition to the set of tuples that quantify the data fidelity metric, correlator 414 may also create another set of tuples that indicate whether the performance of the machine learning model under scrutiny was acceptable at any given time. Such a tuple can also be represented in a binary manner (e.g., "Model OK" or "Model Not OK"). In turn, correlator 414 may assess whether the model performance tuples are correlated with the telemetry fidelity-related tuples.

For example, for one network, correlator 414 may determine that "Model Not OK" has the highest support of "Missing" value of missing-event-state, where as "Missing" has the lowest support for "Model OK." In such cases, correlator 414 may infer that the drop in data fidelity caused by missing values of the telemetry data fields is the prime reason for the ill performance of the model.

In another embodiment, correlator 414 may convert the two-state binary values into a multi-state, and apply the same algorithm as above to determine the cause of the unacceptable performance of the model. For example, the missing-event-state can also be tagged with tags such as: "0-fields-missing," "0-to-5-fields-missing," "greater-than-5-fields-missing," etc. and/or the specific fields that were missing (e.g., "Field-A-missing," "Field-B-missing," etc.). In such a case, the probable cause of the unacceptable model performance can be attributed to the lack of fidelity of these specific telemetry data field/variables.

In another embodiment, rather than simply determining a correlation/root cause of a model performing unacceptably, correlator 414 may also leverage machine learning to predict whether the model will ill perform, given the fidelity of the telemetry data so far. For example, correlator 414 may use a continuous time series of values missing from the telemetry data, if any, to detect the probable cause of any unacceptable model performance. In one embodiment, correlator 414 may use a time series classifier, such as a Long Short-Term Memory (LSTM) or other auto-regressive model), that has been trained to detect whether a given input of data fidelity-related information (e.g., number of missing telemetry data field values, fraction of devices having data ingestion problems, etc.) is likely to result in unacceptable model performance within a certain timeframe (e.g., the next two hours, etc.). Such a model could be used by correlator 414 to predict possible model degradation and initiate corrective measures, proactively.

As would be appreciated, one of the challenges is to calibrate the period of time over which data quality/fidelity may be monitored by ML Ops service 408. Indeed, a drop in data quality may be transient. In such cases, service 408 may not take any corrective actions. Conversely, when the data quality/fidelity issues are persistent or reoccurring and affect the performance of the model, service 408 may initiate corrective measures.

Figure 10:
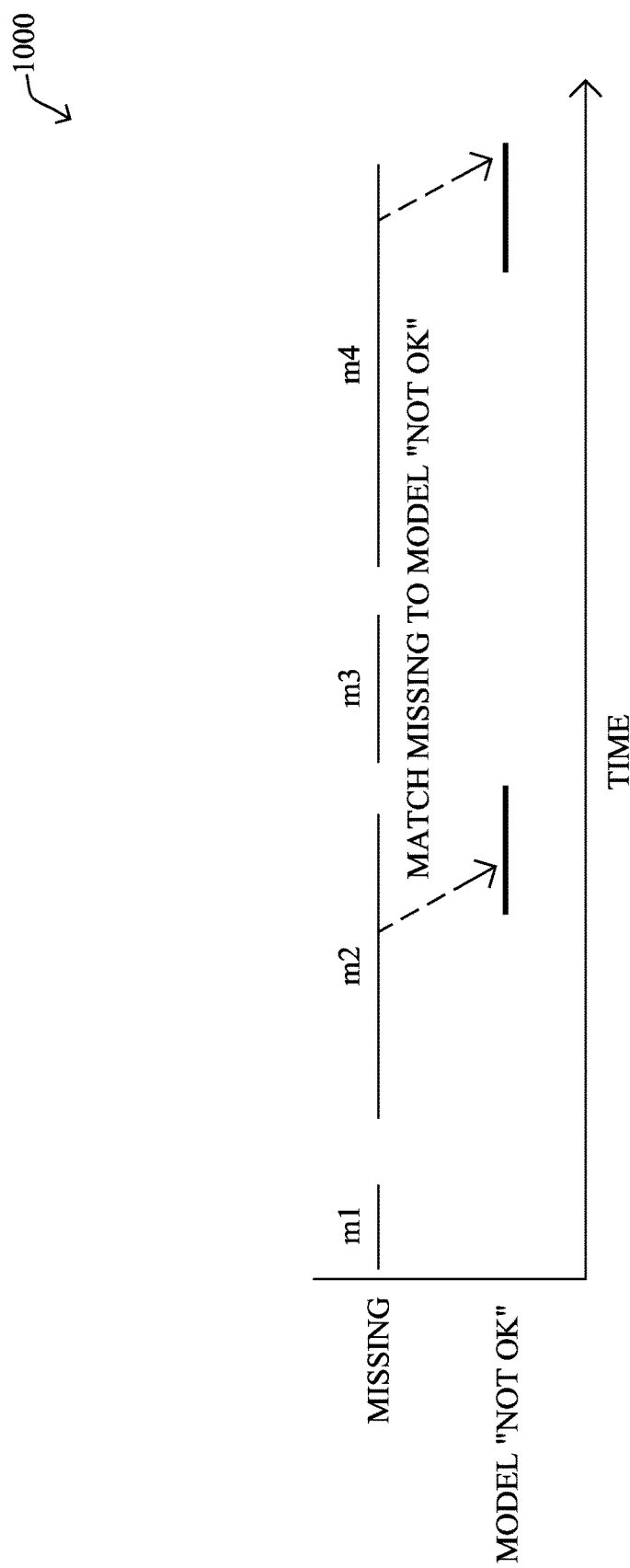
FIG. 10 illustrates an example plot of the correlation of data fidelity issues and unacceptable model performance.

By way of example, consider plot 1000 in FIG. 10 which illustrates the missing data fidelity metric versus the model quality metric over time. More specifically, correlator 414 may identify the time ranges during which the missing data state was "Missing" (e.g., time ranges m1, m2, m3, and m4) and the time ranges during which the model performance was unacceptable, e.g., "Not OK." In turn, correlator 414 may attempt to match the "Not OK" model states with the nearest data "Missing" states of the telemetry data. From plot 1000, this matching intuitively says that the probable reason for model not exhibiting acceptable performance is the missing time-range of the value.

More formally, correlator 414 may compute the empirical distribution of all "Missing" state time ranges (e.g., 5 mins, 10 mins, etc.) that match the model performance state of "Not OK." This distribution describes all the missing time ranges which possibly lead to ill-performance of the model. The mean or the lower percentile (e.g., the $25^{th}$ percentile, etc.) of this time range can be chosen as the minimum time period for which the data has to be missing. For example, if the $25^{th}$ percentile of the distribution is 6 hours, then it means that the data has to missing for at least 6 hours to mark the data as "Missing" for the consequent analysis.

Similarly, correlator 414 may also compute thresholds for ingestion-frequency, spurious values, or any other condition that can negatively affect the fidelity of the telemetry data.

Referring yet again to FIG. 4, a final component of architecture 400 may be feedback engine 416 that is configured to implement a feedback control loop with the network monitoring service (e.g., any of services 402-406), so as to address any model performance issues attributable to a lack of data fidelity of its input telemetry data. In general, this may entail curating telemetry data on the fly, reconstructing spurious data, or even dynamically requesting additional telemetry data on the fly from the telemetry collection mechanism in the monitored network. For example, if ML Ops service 408 determines that the performance of the model of wireless network assurance service 402 is unacceptable due to a data fidelity issue, feedback engine 416 may send one or more instructions 420 back to service 402 to alter how service 402 collects or analyzes telemetry data from the monitored network.

In one embodiment, feedback engine 416 may send instructions 420 to dynamically increase the data quality/fidelity of the telemetry data assessed by the machine learning model of wireless network assurance service 402. As would be appreciated, some machine learning algorithms are inherently tolerant to missing data. Accordingly, feedback engine 416 may also take into account the tolerance(s) of the algorithm to the data fidelity issues (e.g., missing data, spurious data, etc.), before altering the generation of the telemetry data for input to the model. To do so, engine 416 may first determine whether the data quality metrics from telemetry fidelity inspector 410 meet the maximum tolerance of the algorithm or overall system. If so, then feedback engine 416 may take no specific action. However, if the data fidelity level is below the specified tolerance of the machine learning algorithm, or when no tolerance is specified, feedback engine 416 may perform any or all of the following:

Missing Telemetry Data Values: in the case of missing telemetry data, the first counter-measure consists in feedback engine 416 requesting more telemetry data via an instruction 420, to compensate for the missing data. Upon receiving such a request/instruction, the corresponding networking device may simply gather all required data locally available for an amount of time (e.g., the past×seconds, which may optionally be specified in the request). If the data is locally missing, then the networking device may send an error message back to feedback engine 416. Another approach may be for the networking device to locally guess/predict the missing telemetry data values. For example, the networking device may use a regression model to predict the missing data values based on the prior set of values.

Spurious Data: In the case of spurious data, feedback engine 416 may send an instruction that causes the spurious data to be reconstructed. For example, the central engine of service 402 may use a regression model to compute data values to replace spurious values with correct ones, based on other inputs. For example, such a regression model may compute an RSSI value based on other telemetry data values, such as the transmit energy or the like. Similarly, in the case of SD-WAN assurance service 404, the bandwidth usage by a tunnel may be recomputed based on the Tx/RZ counters over time.

Figure 11:
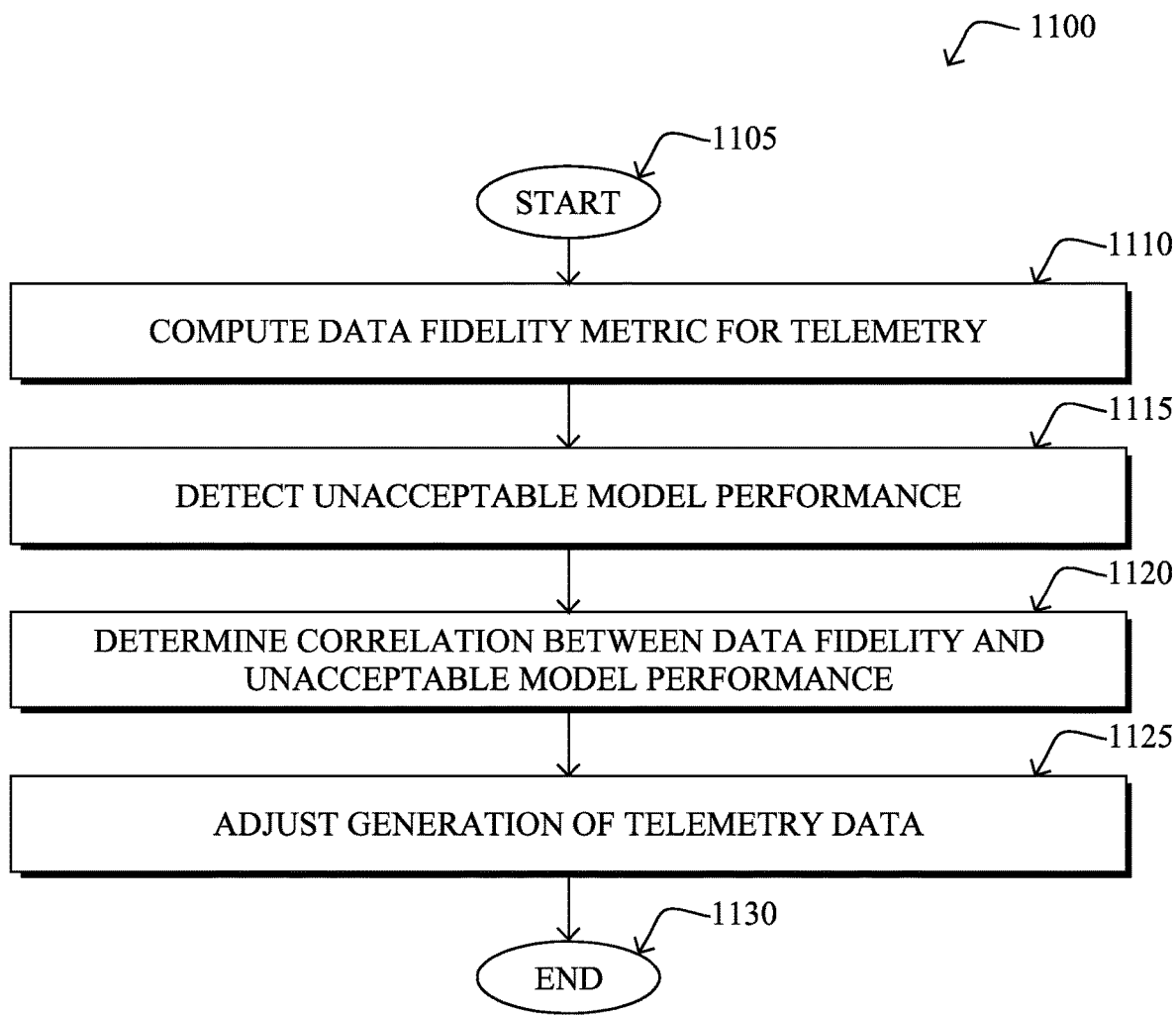
FIG. 11 illustrates an example simplified procedure for assessing data quality in a machine learning-based network assurance system or other system that monitors a network.

FIG. 11 illustrates an example simplified procedure for assessing data quality in a machine learning-based network assurance system or other system that monitors a network, in accordance with one or more embodiments described herein. For example, a non-generic, specifically configured device may perform procedure 1100 by executing stored instructions, to provide a service to one or more networks. The procedure 1100 may start at step 1105, and continues to step 1110, where, as described in greater detail above, the service may compute a data fidelity metric for network telemetry data used by a machine learning model to monitor a computer network. For example, such a model may be executed by a network assurance service/system, a system/service that uses the model to classify devices in the network by device type, or the like. In various embodiments, the computed data fidelity metric may be based in part on a sampling frequency at which the network telemetry data is collected in the network, based in part on missing values in the telemetry data, or based in part on spurious data in the telemetry data.

At step 1115, as detailed above, the service may detect unacceptable performance of the machine learning model. For example, assume that the model comprises an anomaly detector configured to detect anomalous behaviors of the monitored network. In such a case, unacceptable performance of the model may correspond to the anomaly detector detecting more than a threshold percentage of anomalies (e.g., within a certain amount of time) Likewise, unacceptable performance of the model may be measured in terms of precision, recall, false positives, false negatives, combinations thereof, or the like.

At step 1120, the service may determine a correlation between the data fidelity metric and the unacceptable performance of the machine learning model, as described in greater detail above. In some embodiments, the service may employ statistical analysis, to determine the correlation. In further embodiments, the service may predict whether performance of the machine learning model will be unacceptable, given a particular input set of network telemetry data.

At step 1125, as detailed above, the service may adjust generation of the network telemetry data for input to the machine learning model, based on the determined correlation between the data fidelity metric and the unacceptable performance of the machine learning model. In various embodiments, the service may do so by adjusting the sampling frequency at which the network telemetry data is collected in the network, by using a regression model to predict the missing values, prior to input to the machine learning model, by using a regression model to reconstruct the spurious data, prior to input to the machine learning model, by sending an instruction to an entity in the network to collect missing telemetry values, or the like. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the assessment of how the data fidelity/quality of telemetry data used as input to a machine learning model affects the performance of the model. In further aspects, the techniques herein also introduce a feedback mechanism, allowing a service to dynamically adjust how the telemetry data is generated, so as to address the fidelity/quality issues.

While there have been shown and described illustrative embodiments that provide for assessing data fidelity in a machine learning-based network assurance system or other network monitoring system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
computing, by a service, a data fidelity metric for network telemetry data used by a machine learning model to monitor a computer network, wherein the data fidelity metric is computed based in part on missing values in the network telemetry data;
detecting, by the service, unacceptable performance of the machine learning model;
determining, by the service, a correlation between the data fidelity metric and the unacceptable performance of the machine learning model; and
adjusting, by the service, generation of the network telemetry data for input to the machine learning model, based on the determined correlation between the data fidelity metric and the unacceptable performance of the machine learning model.

2. The method as in claim 1, wherein the machine learning model comprises an anomaly detector, and wherein the unacceptable performance of the machine learning model corresponds to the anomaly detector detecting more than a threshold percentage of anomalies.

3. The method as in claim 1, wherein determining a correlation between the data fidelity metric and the unacceptable performance of the machine learning model comprises:
predicting whether performance of the machine learning model will be unacceptable, given a particular input set of network telemetry data.

4. The method as in claim 1, wherein the data fidelity metric is computed based in part on a sampling frequency at which the network telemetry data is collected in the network, and wherein adjusting generation of the network telemetry data comprises:
adjusting the sampling frequency at which the network telemetry data is collected in the network.

5. The method as in claim 1, wherein adjusting generation of the network telemetry data comprises:
using a regression model to predict the missing values, prior to input to the machine learning model.

6. The method as in claim 1, wherein adjusting generation of the network telemetry data comprises:

sending an instruction to an entity in the network to collect the missing values.

7. The method as in claim 1, wherein the data fidelity metric is computed based in part on spurious data in the network telemetry data, and wherein adjusting generation of the network telemetry data comprises:
using a regression model to reconstruct the spurious data, prior to input to the machine learning model.

8. The method as in claim 1, wherein the machine learning model is part of a network assurance system.

9. The method as in claim 1, wherein the machine learning model is configured to classify devices in the network by device type.

10. An apparatus, comprising:
one or more network interfaces;
a processor coupled to the network interfaces and configured to execute one or more processes; and
a memory configured to store a process executable by the processor, the process when executed configured to:
compute a data fidelity metric for network telemetry data used by a machine learning model to monitor a computer network, wherein the data fidelity metric is computed based in part on missing values in the network telemetry data;
detect unacceptable performance of the machine learning model;
determine a correlation between the data fidelity metric and the unacceptable performance of the machine learning model; and
adjust generation of the network telemetry data for input to the machine learning model, based on the determined correlation between the data fidelity metric and the unacceptable performance of the machine learning model.

11. The apparatus as in claim 10, wherein the machine learning model comprises an anomaly detector, and wherein the unacceptable performance of the machine learning model corresponds to the anomaly detector detecting more than a threshold percentage of anomalies.

12. The apparatus as in claim 10, wherein the apparatus determines a correlation between the data fidelity metric and the unacceptable performance of the machine learning model by:
predicting whether performance of the machine learning model will be unacceptable, given a particular input set of network telemetry data.

13. The apparatus as in claim 10, wherein the data fidelity metric is computed based in part on a sampling frequency at which the network telemetry data is collected in the network, and wherein the apparatus adjusts generation of the network telemetry data by:
adjusting the sampling frequency at which the network telemetry data is collected in the network.

14. The apparatus as in claim 10, wherein the apparatus adjusts generation of the network telemetry data by:
using a regression model to predict the missing values, prior to input to the machine learning model.

15. The apparatus as in claim 10, wherein the apparatus adjusts generation of the network telemetry data by:
sending an instruction to an entity in the network to collect the missing values.

16. The apparatus as in claim 10, wherein the data fidelity metric is computed based in part on spurious data in the network telemetry data, and wherein the apparatus adjusts generation of the network telemetry data by:
using a regression model to reconstruct the spurious data, prior to input to the machine learning model.

17. The apparatus as in claim 10, wherein the machine learning model is part of a network assurance system or is configured to classify devices in the network with device types.

18. A tangible, non-transitory, computer-readable medium storing program instructions that cause a service to execute a process comprising:
computing, by a service, a data fidelity metric for network telemetry data used by a machine learning model to monitor a computer network, wherein the data fidelity metric is computed based in part on missing values in the network telemetry data;
detecting, by the service, unacceptable performance of the machine learning model;
determining, by the service, a correlation between the data fidelity metric and the unacceptable performance of the machine learning model; and
adjusting, by the service, generation of the network telemetry data for input to the machine learning model, based on the determined correlation between the data fidelity metric and the unacceptable performance of the machine learning model.

* * * * *

UNITED STATES PATENT AND TRADEMARK OFFICE
CERTIFICATE OF CORRECTION

PATENT NO. : 11,397,876 B2
APPLICATION NO. : 16/692165
DATED : July 26, 2022
INVENTOR(S) : Jean-Philippe Vasseur It is certified that error appears in the above-identified patent and that said Letters Patent is hereby corrected as shown below:

In the Specification

Column 15, Line 15, please amend as shown:
tests such as Shapiro- Wilk test), then telemetry fidelity Column 16, Line 11, please amend as shown:
acceptable or not). This can be constructed by evaluating the Column 16, Line 25, please amend as shown:
a time series regressor that predicts the network throughput Column 19, Line 24, please amend as shown:
e.g., within a certain amount of time). Likewise, unaccept- Signed and Sealed this
Fourth Day of October, 2022

Katherine Kelly Vidal
*Director of the United States Patent and Trademark Office*